United States Patent [19]
Martin et al.

[11] Patent Number: 6,032,220
[45] Date of Patent: Feb. 29, 2000

[54] MEMORY DEVICE WITH DUAL TIMING AND SIGNAL LATCHING CONTROL

[75] Inventors: Chris G. Martin; Troy A. Manning, both of Boise, Id.

[73] Assignee: Micron Technology, Inc., Boise, Id.

[21] Appl. No.: 08/896,405

[22] Filed: Jul. 18, 1997

[51] Int. Cl.[7] .................................................. G06F 12/00
[52] U.S. Cl. .............................................. 711/5; 711/105
[58] Field of Search ...................... 711/5, 105; 395/823, 395/825; 365/230.03, 230.08

[56] References Cited

U.S. PATENT DOCUMENTS

| | | | |
|---|---|---|---|
| 5,072,424 | 12/1991 | Brent et al. | 365/189.01 |
| 5,159,572 | 10/1992 | Morton | 365/230.06 |
| 5,202,857 | 4/1993 | Yanai et al. | 365/233 |
| 5,323,360 | 6/1994 | Pelley, III | 365/233.5 |
| 5,598,376 | 1/1997 | Merritt et al. | 365/230.06 |
| 5,636,173 | 6/1997 | Schaefer | 365/230.03 |
| 5,757,715 | 5/1998 | Williams et al. | 365/230.03 |
| 5,771,199 | 6/1998 | Lee | 365/230.03 |
| 5,774,409 | 6/1998 | Yamazaki et al. | 365/230.03 |
| 5,781,496 | 7/1998 | Pinkham et al. | 365/230.03 |
| 5,825,711 | 10/1998 | Manning | 365/230.03 |
| 5,841,731 | 11/1998 | Shinozaki | 365/233 |
| 5,870,350 | 2/1999 | Bertin et al. | 365/233 |

FOREIGN PATENT DOCUMENTS 0 640 985 A2   3/1995   European Pat. Off.   ........ G11C 16/06

OTHER PUBLICATIONS

Description literature entitled, "400 MHz SLDRAM, 4M×16 SLDRAM Pipelined, Eight Bank, 2.5 V Operation", pp. 1–22.

"Draft Standard for a High–Speed Memory Interface (SyncLink)", Microprocessor and Microcomputer Standards Subcommittee of the IEEE Computer Society, Copyright 1996 by the Institute of Electrical and Electronics Engineers, Inc., New York, NY, pp. 1–56.

*Primary Examiner*—Jack A. Lane
*Attorney, Agent, or Firm*—Dorsey & Whitney LLP

[57] ABSTRACT

In a packetized memory device, pipelined row and column address paths receive row and column addresses from an address capture circuit. Each of the row and column address paths includes a respective address latch that latches the row or column address from the address capture circuitry, thereby freeing the address capture circuitry to capture a subsequent address. The column path also includes a set of bank address latches so that bank addresses can be pipelined synchronously with column addresses. The latched row and column addresses are then provided to a combining circuit. Additionally, redundant row and column circuits receive these latched addresses and indicate to the combining circuit whether or not to substitute a redundant row. The combining circuit, responsive to a strobe then transfers the redundant row address or latched row address to a decoder to activate the array. The bank address latches also activate a selected bank responsive to the strobe.

45 Claims, 9 Drawing Sheets

MEMORY DEVICE WITH DUAL TIMING AND SIGNAL LATCHING CONTROL

TECHNICAL FIELD

The present invention relates to integrated circuit devices, and more particularly, to synchronous memory devices.

BACKGROUND OF THE INVENTION

Conventional computer systems include a processor coupled to a variety of memory devices, including read-only memories ("ROMs") which traditionally store instructions for the processor, and a system memory to which the processor may write data and from which the processor may read data. The processor may also communicate with an external cache memory, which is generally a static random access memory ("SRAM"). The processor also communicates with input devices, output devices, and data storage devices.

Processors generally operate at a relatively high speed. Processors such as the Pentium® and Pentium Pro® microprocessors are currently available that operate at clock speeds of at least 200 MHz. However, the remaining components of the computer system, with the exception of SRAM cache memory, are not capable of operating at the speed of the processor. For this reason, the system memory devices, as well as the input devices, output devices, and data storage devices, are not coupled directly to the processor bus. Instead, the system memory devices are generally coupled to the processor bus through a memory controller, and the input devices, output devices, and data storage devices are coupled to the processor bus through a bus bridge. The memory controller allows the system memory devices to operate at a clock frequency that is substantially lower than the clock frequency of the processor. Similarly, the bus bridge allows the input devices, output devices, and data storage devices to operate at frequency that is a substantially lower than the clock frequency of the processor. Currently, for example, a processor having a 200 MHz clock frequency may be mounted on a mother board having a 66 MHz clock frequency for controlling the system memory devices and other components.

Access to system memory is a frequent operation for the processor. The time required for the processor, operating, for example, at 200 MHz, to read data from or write data to a system memory device operating at, for example, 66 MHz, greatly slows the rate at which the processor is able to accomplish its operations. Thus, much effort has been devoted to increasing the operating speed of system memory devices.

System memory devices are generally dynamic random access memories ("DRAMs"). Initially, DRAMs were asynchronous and thus did not operate at even the clock speed of the motherboard. In fact, access to asynchronous DRAMs often required that wait states be generated to halt the processor until the DRAM had completed a memory transfer. However, the operating speed of asynchronous DRAMs was successfully increased through such innovations as burst and page mode DRAMs, which did not require that an address be provided to the DRAM for each memory access. More recently, synchronous dynamic random access memories ("SDRAMs") have been developed to allow the pipelined transfer of data at the clock speed of the motherboard. However, even SDRAMs are typically incapable of operating at the clock speed of currently available processors. Thus, SDRAMs cannot be connected directly to the processor bus, but instead must interface with the processor bus through a memory controller, bus bridge, or similar device. The disparity between the operating speed of the processor and the operating speed of SDRAMs continues to limit the speed at which processors may complete operations requiring access to system memory.

A solution to this operating speed disparity has been proposed in the form of a computer architecture known as "SyncLink." In the SyncLink architecture, the system memory may be coupled to the processor directly through the processor bus. Rather than requiring that separate address and control signals be provided to the system memory, SyncLink memory devices receive command packets that include both control and address information. The SyncLink memory device then outputs or receives data on a data bus that is coupled directly to the data bus portion of the processor bus.

Figure 1:
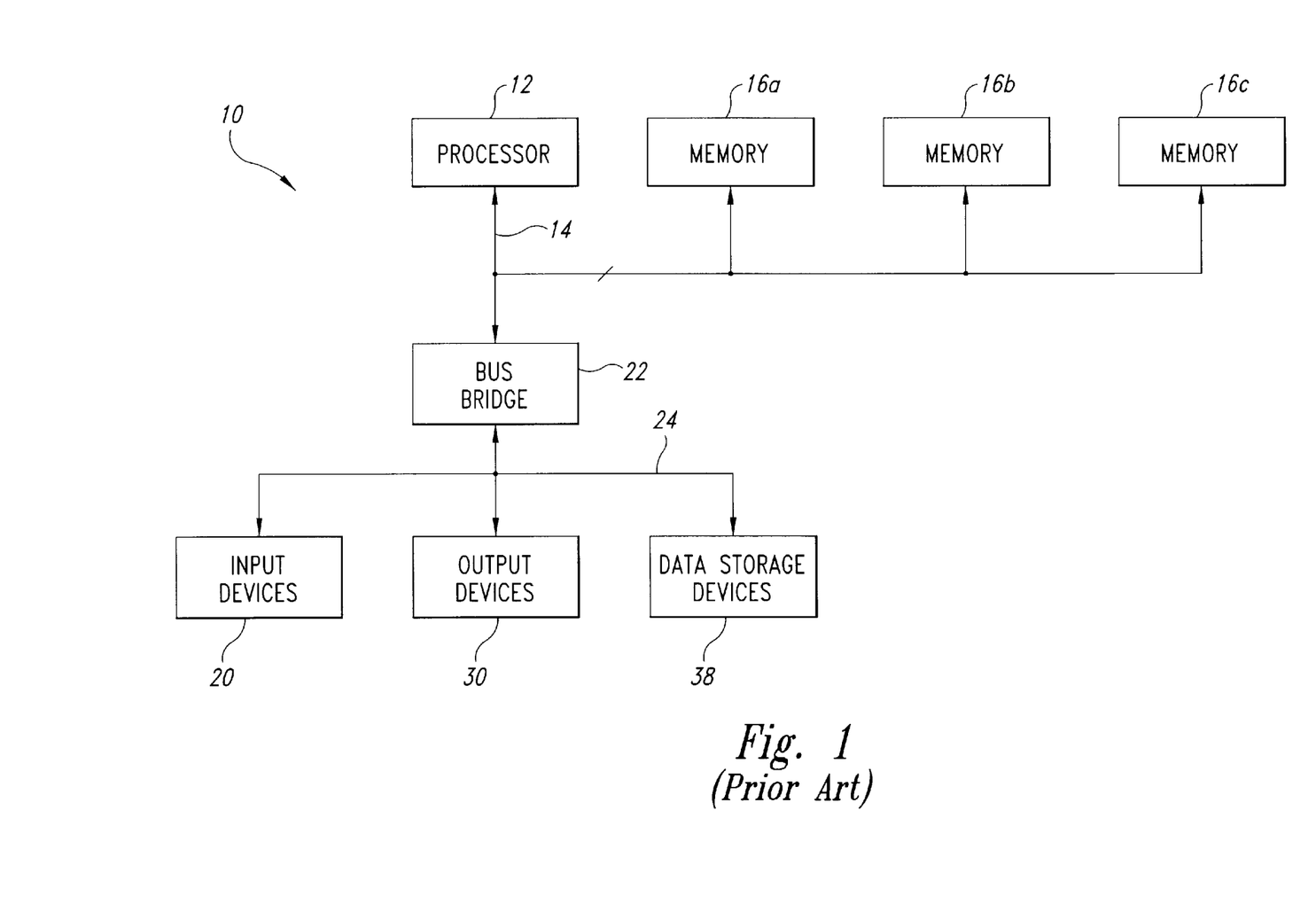
FIG. 1 is a block diagram of a computer system using SyncLink architecture.

An example of a computer system 10 using the SyncLink architecture is shown in FIG. 1. The computer system 10 includes a processor 12 having a processor bus 14 coupled to three packetized dynamic random access memory or SyncLink DRAMs ("SLDRAM") devices 16a–c. The computer system 10 also includes one or more input devices 20, such as a keypad or a mouse, coupled to the processor 12 through a bus bridge 22 and an expansion bus 24, such as an industry standard architecture ("ISA") bus or a Peripheral component interconnect ("PCI") bus. The input devices 20 allow an operator or an electronic device to input data to the computer system 10. One or more output devices 30 are coupled to the processor 12 to display or otherwise output data generated by the processor 12. The output devices 30 are coupled to the processor 12 through the expansion bus 24, bus bridge 22 and processor bus 14. Examples of output devices 24 include printers and a video display units. One or more data storage devices 38 are coupled to the processor 12 through the processor bus 14, bus bridge 22, and expansion bus 24 to store data in or retrieve data from storage media (not shown). Examples of storage devices 38 and storage media include fixed disk drives floppy disk drives, tape cassettes and compact-disk read-only memory drives.

In operation, the processor 12 communicates with the memory devices 16a–c via the processor bus 14 by sending the memory devices 16a–c command packets that contain both control and address information. Data is coupled between the processor 12 and the memory devices 16a–c, through a data bus portion of the processor bus 14. Although all the memory devices 16a–c are coupled to the same conductors of the processor bus 14, only one memory device 16a–c at a time reads or writes data, thus avoiding bus contention on the processor bus 14. Bus contention is avoided by each of the memory devices 16a–c on the bus bridge 22 having a unique identifier, and the command packet contains an identifying code that selects only one of these components.

The computer system 10 also includes a number of other components and signal lines which have been omitted from FIG. 1 in the interests of brevity. For example, as explained below, the memory devices 16a–c also receive a master clock signal CKEXT to provide internal timing signals, a data clock signal DCLK clocking data into or out of the memory device 16, and a FLAG signal signifying the start of a command packet.

Figure 2:
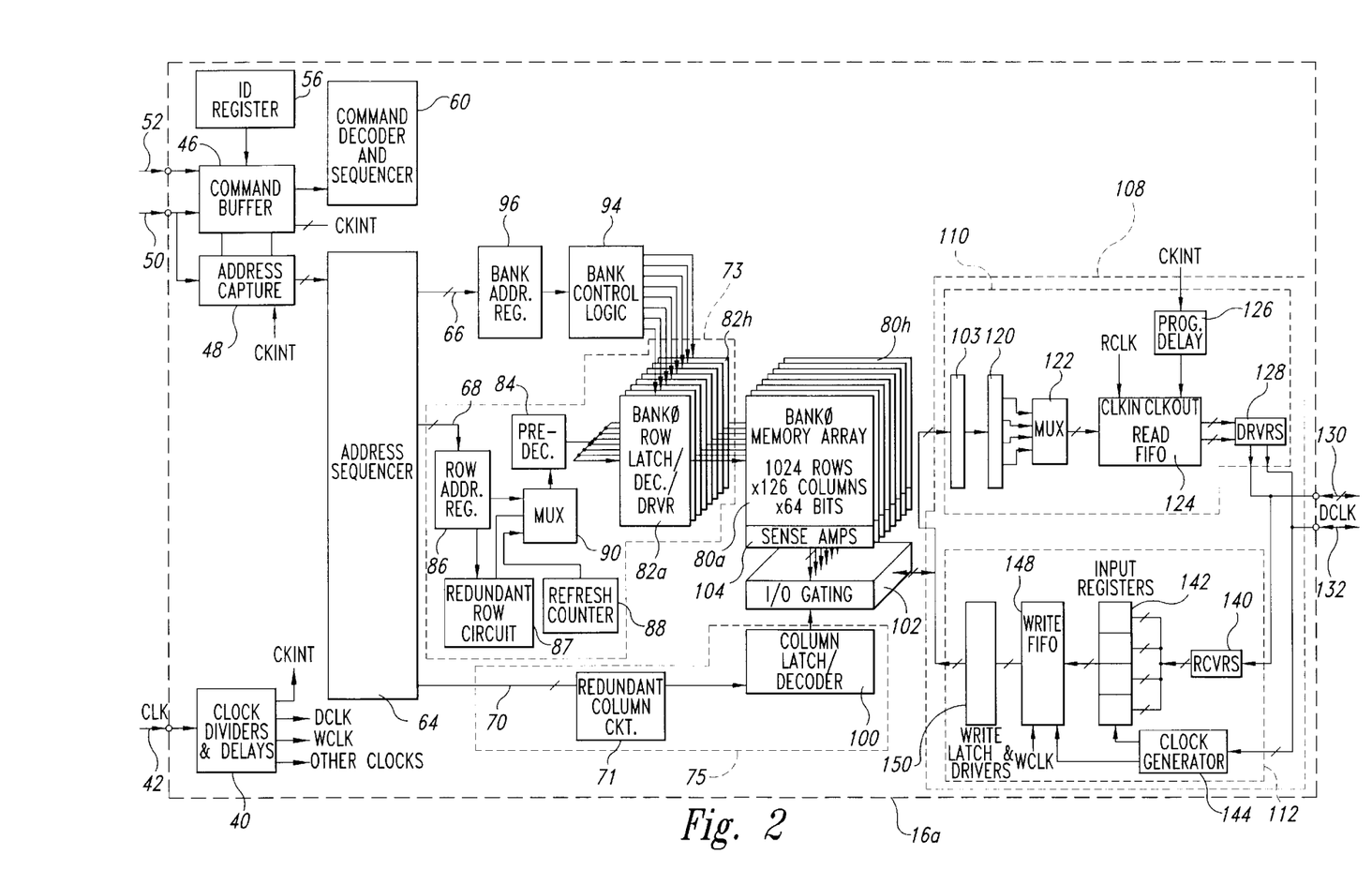
FIG. 2 is a block diagram of a packetized DRAM used in the computer system of FIG. 1.

One of the memory devices 16a is shown in block diagram form in FIG. 2. The memory device 16a includes a clock divider and delay circuit 40 that receives a master clock signal CKEXT and generates an internal clock signal CKINT and a large number of other clock and timing signals to control the timing of various operations in the memory device 16. The memory device 16 also includes a command buffer 46 and an address capture circuit 48 which receive an internal clock signal CKINT, a command packet CA0–CA9 on a 10-bit command bus 50, and a FLAG signal on line 52. As explained above, the command packet contains control and address information for each memory transfer, and the FLAG signal identifies the start of a command packet which may include more than one 10-bit packet word. In fact, a command packet is generally in the form of a sequence of 10-bit packet words on the 10-bit command bus 50. The command buffer 46 receives the command packet from the bus 50, and compares at least a portion of the command packet to identifying data from an ID register 56 to determine if the command packet is directed to the memory device 16a or some other memory device 16b, c. If the command buffer 46 determines that the command packet is directed to the memory device 16a, it then provides a command word to a command decoder and sequencer 60. The command decoder and sequencer 60 generates a large number of internal control signals to control the operation of the memory device 16a during a memory transfer.

The address capture circuit 48 also receives the command words from the command bus 50 and outputs a 20-bit address corresponding to the address information in the command packet. The address is provided to an address sequencer 64 which generates a corresponding 3-bit bank address on bus 66, a 10-bit row address on bus 68, and a 7-bit column address on bus 70. The column address and row address are processed by column and row address paths 73, 75 as will be described below.

One of the problems of conventional DRAMs is their relatively low speed resulting from the time required to precharge and equilibrate circuitry in the DRAM array. The packetized DRAM 16a shown in FIG. 2 largely avoids this problem by using a plurality of memory banks 80, in this case eight memory banks 80a–h. After a memory read from one bank 80a, the bank 80a can be precharged while the remaining banks 80b–h are being accessed. Each of the memory banks 80a–h receive a row address from a respective row latch/decoder/driver 82a–h. All of the row latch/decoder/drivers 82a–h receive the same row address from a predecoder 84 which, in turn, receives a row address from either a row address register 86, redundant row circuit 87, or a refresh counter 88 as determined by a multiplexer 90. However, only one of the row latch/decoder/drivers 82a–h is active at any one time as determined by bank control logic 94 as a function of a bank address from a bank address register 96.

The column address on bus 70 is applied through a column address path 75 to a redundant column circuit 71 that determines if the column address corresponds to a defective address. The redundant column circuit 71 outputs either the column address or a redundant column address to a column latch/decoder 100 which supplies I/O gating signals to an I/O gating circuit 102. The I/O gating circuit 102 interfaces with columns of the memory banks 80a–h through sense amplifiers 104. Data is coupled to or from the memory banks 80a–h through the sense amplifiers 104 and I/O gating circuit 102 to a data path subsystem 108 which includes a read data path 110 and a write data path 112. The read data path 110 includes a bank of DC sense amplifiers 103 and a read atch 120 that amplify and store data from the I/O gating circuit 102. In the emory device 16a shown in FIG. 2, 64 bits of data are stored in the read latch 120. The read latch then provides four 16-bit data words to an output multiplexer 122 that sequentially supplies each of the 16-bit data words to a read FIFO buffer 124. Successive 16-bit data words are clocked through the read FIFO buffer 124 by a clock signal RCLK generated from the internal clock CKINT by a programmable delay circuit 126. The read FIFO buffer 124 sequentially applies the 16-bit words to a driver circuit 128 which, in turn, applies the 16-bit data words to a data bus 130 forming part of the processor bus 14.

The write data path 112 includes a receiver buffer 140 coupled to the data bus 130. The receiver buffer 140 sequentially applies 16-bit words from the data bus 130 to four input registers 142, each of which is selectively enabled by a signal from a clock generator circuit 144 responsive to the data clock DCLK. Thus, the input registers 142 sequentially store four 16-bit data words and combine them into one 64-bit data word applied to a write FIFO buffer 148. The write FIFO buffer 148 is clocked by a signal from the clock generator 144 and an internal write clock WCLK to sequentially apply 64-bit write data to a write latch and driver 150. The write latch and driver 150 applies the 64-bit write data to one of the memory banks 80a–h through the I/O gating circuit 102 and the sense amplifiers 104.

As mentioned above, an important goal of the SyncLink architecture is to allow data transfer between a processor and a memory device to occur at a significantly faster rate. However, the operating rate of a packetized DRAM, including the packetized DRAM shown in FIG. 2, is limited by the time required to receive and process command packets applied to the memory device 16a. More specifically, not only must the command packets be received and stored, but they must also be decoded and used to generate a wide variety of signals, including row, bank and column addresses. However, in order for the memory device 16a to operate at a very high speed, the command packets must be applied to the memory device 16a at a correspondingly high speed. As the operating speed of the memory device 16a increases, the command packets are provided to the memory device 16a at a rate that can exceed the rate at which the address capture circuit 48, the address predecoders 84, the row address registers 86, the latch/decoder/drivers 82a–h, and the column address path 75 can capture and process the addresses.

As the memory device receives and processes command packets at a high rate, command processing circuitry, such as the command buffer 46, produce internal command signals at very high speeds. These high speed command signals must be delivered to the circuitry associated with each of the eight banks 80a–80h. For example, command signals such as precharge and equilibrate signals are transmitted to the row latch/decoder/drivers 82a–82h from the decoder and sequencer 60. Delivery of all of the command signals to the eight banks 80a–80h can require several sets of signal lines, each extending from the command decoder and sequencer 60. Delivery of all of the command signals to the eight banks 80a–80h can require several sets of signal lines, each extending from the command decoder and sequencer 60 to each of the latch/decoder/drivers 82a–82h associated with each of the eight memory banks 80a–82h associated with each of the eight memory banks 80a–80h. Each of the lines consume valuable area on a substrate and complicate routing of signal lines.

Additionally, the internal command signals require time to propagate from the command sequencer and decoder 60 to the various circuitry for accessing the banks 80a–80h. Routing differences between the bank control logic 94 and the latch/decoder/drivers 82a–82h can therefore cause differences in the times at which the internal command signal reach the latch/decoder/driver 82a–82h. The differences in arrival times can become significant at high speeds of operation and eventually limit the operating speed of the packetized DRAM.

Although the foregoing discussion is directed to the need for faster command buffers in packetized DRAMs, similar problems exist in other memory devices, such as asynchronous DRAMs and synchronous DRAMs, which must process control and other signals at a high rate of speed. Thus, for the reasons explained above, the limited operating speed of conventional processing of addresses and commands threatens to limit the maximum operating speed of memory devices, particularly packetized DRAMs. Therefore, there is a need for address handling and command processing circuitry that is able to receive and process command packets at a high rate.

SUMMARY OF THE INVENTION

A high-speed memory device includes a pipelined address path, a global timing circuit, local control circuits and local latches. Global signals from the global timing circuit act as latch control signals to latch addresses or other control signals at the lead latches. Additionally, the global signals activate one or more of the local timing circuits to produce local timing signals. The global signal may also activate latches within a pipeline of row or column address path.

In one embodiment, the memory device is a packetized memory device that receives a command packet including command and address information. The command information is processed by a command buffer and command sequencer and decoder. The address information is captured by an address capture circuit that extracts row, column, and bank addresses from the packet.

The captured address is input to an address latch that latches the address responsive to a global control signal. The latched address is then applied to a redundant detect circuit that determines if the latched address corresponds to a defective row or column. If the latched address corresponds to a defective row or column, the redundant detect circuit outputs an address of a redundant row or column. The redundant address or the latched address are then latched at a first interim latch responsive to a strobe signal responsive to the global control signal. The interim latch provides the address to a data transfer circuitry that controls reading and writing to a memory array responsive to local control signals.

Each bank of the memory array includes a respective local timing circuit that produces the local control signals responsive to the global control signal. The global control signal thus acts as a latch control signal to control latching of the address and as a timing signal to initiate a data transfer operation.

In one embodiment, respective local latches are coupled to each of the local timing circuits to receive addressing information and certain other signals. The global control signals activate the local latches to latch the addressing information and other signals.

DETAILED DESCRIPTION OF THE INVENTION

Figure 3:
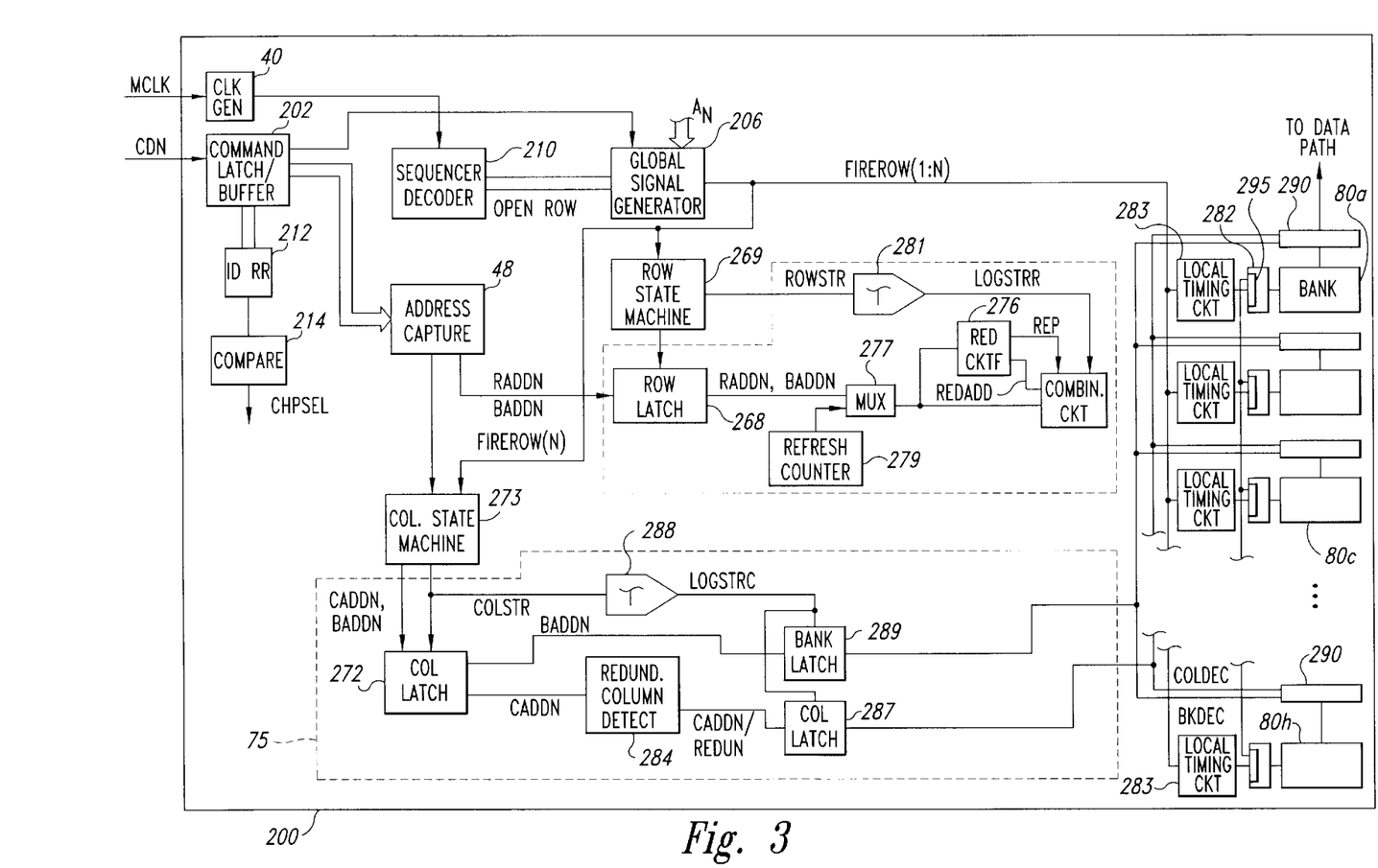
FIG. 3 is a block diagram of a portion of a packetized DRAM according to one embodiment of the invention, including address paths coupled to banks of a memory array.

One embodiment of a portion of a memory device 200 shown in FIG. 3 includes column and row address paths 73, 75 in accordance with the invention and may be used in the computer system shown in FIG. 1. The memory device 200 includes several of the same elements as the memory device 16 of FIG. 2, where elements common to both memory device 16, 200 are numbered the same. Also, one skilled in the art will recognize that several elements of the memory device 200, such as the read and write data paths have been omitted from FIG. 3 for clarity of presentation.

In the memory device 200, a command latch 202 receives a command packet CDN from a command bus 204. The width of the command bus 204 corresponds to the size of command latch 202, and the number of packet words in the command packet CDN corresponds to the number of stages of the command latch 202. In the embodiment shown in FIG. 3, the command latch has four stages, each of which is 10 bits wide. Thus, the command latch 202 sequentially receives four 10-bit packet words responsive to the internal clock signal CKINT from the clock divider and delay circuit 40. The command latch 202 latches packet words on every transition (either high-to-low or low-to-high) of the internal clock signal CKINT. Thus, the entire command packet CDN is received during two complete cycles of the internal clock signal CKINT.

In the embodiment shown in FIG. 3, the command latches 202 receive and store a 40-bit command word. However, in the more general case, the command latches 202 may have N stages, each of which has a width of M bits, so that the command latches store M*N bits of the command word. Once the command latches 202 are loaded, the latches output the command word to a sequencer and decoder 210, an ID register 212, and a compare circuit 214. The decoder 210, ID register 212, and comparator 214 determine whether the command packet CDN is intended for the memory device 200 containing the column and row address paths 73, 75. If the command packet CDN is intended for the memory device 200, the comparator 214 generates a chip select signal CHPSEL and other internal control signals for controlling operation of the memory device 200.

Unlike the memory device 16 of FIG. 2, in the memory device 200 of FIG. 3, the address capture circuit 48 outputs the 10-bit row address and 3-bit bank address BADD0 to a row latch 268 within the row address path 73 and outputs the 7-bit column address and 3-bit bank address to a column latch 272 within the column address path 75. Operation of the row address path 73 will be described first with reference to FIGS. 3 and 4.

Figure 4:
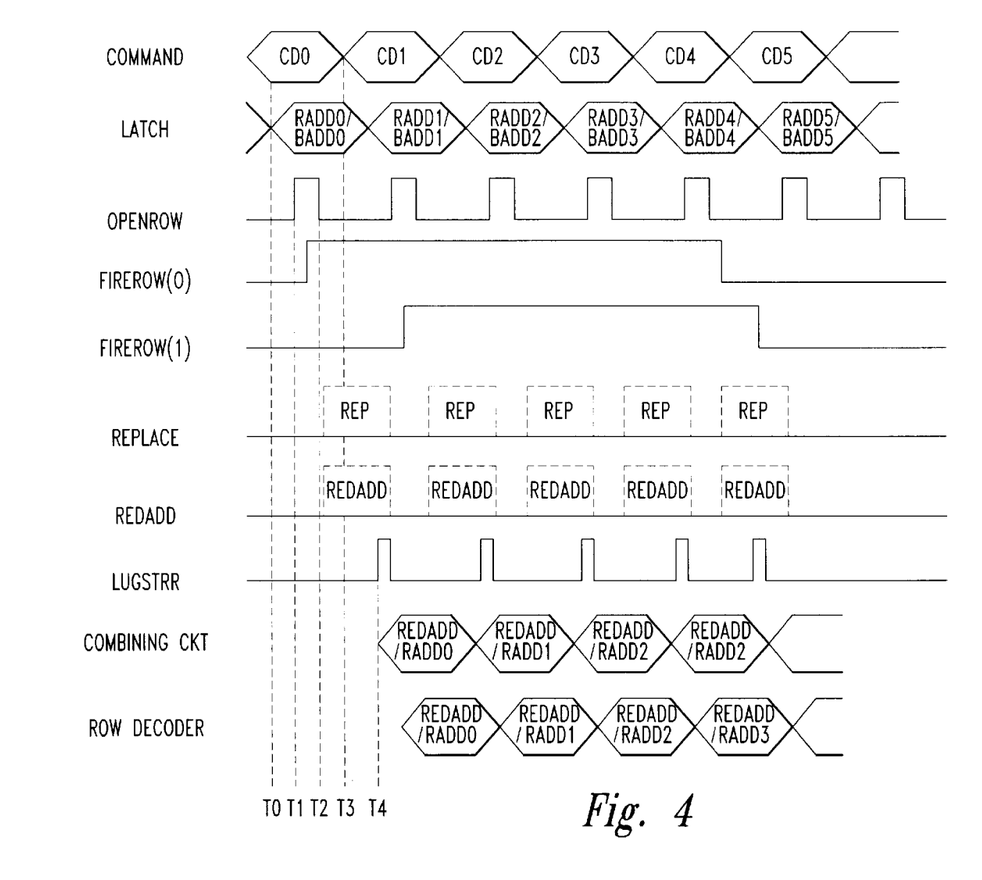
FIG. 4 is a signal timing diagram showing selected signals used in the row address path of FIG. 3.

As shown in FIG. 4, a first command packet CD0 arrives at time to and the address capture circuit 48 captures a 3-bit bank address BADD0 and a 10-bit row address RADD0 from the packet. The command sequencer and decoder 210 determines that the addresses have been captured and outputs a primary row signal OPENROW signal at time $t_1$ which the global signal generator 206 receives along with the bank address BADD0. Responsive to a high-going transition of OPENROW, the global signal generator 206 outputs a bank-specific row activation signals FIREROW (N). Each row activation signal FIREROW(N) acts as address latch signal along the row and column address paths 73, 75, acts as a control latch signal and acts as a timing signal to activate the respective local timing circuit 283. Address latching along the row address path 73 will be described first.

FIREROW(N) acts as a latching signal by activating a row state machine 269 that controls a row latch 268 to latch the row address RADD0 and bank address BADD0. One skilled in the art will recognize that the row activation signals FIREROW(N) will be logically combined with other bank-specific row activation signals to activate the row state machine 269. For example, the row activation signals FIREROW(N) can be combined by an OR gate so that the row state machine 269 will be activated if any of the row activation signals FIREROW(N) is high. Alternatively, OPENROW, or a delayed version of OPENROW can activate the row state machine 269. Also, one skilled in the art will recognize that, by latching the row address RADD0 in the row latch 268 at time $t_1$, the command latch 202 and address capture circuit 48 are freed to receive and capture addresses from a new command packet. The row latch 268 provides the latched addresses RADD0, BADD0 to a multiplexer 277 that also receives refresh addresses from a refresh counter 279. The multiplexer 277 forwards the latched addresses RADD0, BADD0 or the refresh address to a combining circuit 280. Once the first row address RADD0 and bank address BADD0 are latched, the command latches 202 no longer need to provide the row and bank address bits of the command word CD0 to the address capture circuit 48.

After the row latch 268 latches the first row address RADD0 and first bank address BADD0, redundant row circuitry 276 determines in a conventional fashion whether the row corresponding to the first row and bank address RADD0, BADD0 or refresh address is defective. If the row and bank addresses RADD0, BADD0 or refresh address correspond to a defective row, the redundant detect circuitry 276 outputs a replace signal REP and a redundant row address REDADD. The replace signal REP and redundant row address REDADD are applied to the combining circuit 280 along with the row and bank address RADD0, BADD0 or the refresh address from the multiplexer 277.

Although the combining circuit 280 receives an address at time $t_2$, the combining circuit 280 output does not change until a delay circuit 281, driven by the row state machine 269, supplies a row logic strobe LOGSTRR at time t4, as shown in the fourth line of FIG. 4. At time t4, the combining circuit 280 outputs either the redundant row address REDADD or the address from the multiplexer 279 to row decoders 282 coupled to each of the banks 80a–80h. Additionally, the combining circuit 280 provides the 3-bit bank address BADD0 to enable one of the eight decoders 282. The actual activation of the row or redundant row by the decoder 282 is triggered by local timing signals from the local timing circuits 283 in response to the respective row activation signal FIREROW(N), as will be described below.

At time $t_3$, while the row latch 268, redundant row circuitry 276 and row decoder 282 are processing the first row and bank addresses RADD0, BADD0, a second command packet CD1 reaches the command latches 202. The address capture circuit 48 can begin capturing second row and bank addresses RADD1, BADD1 immediately, because changes in the output of the address capture circuitry 48 will not affect the addresses received by the decoder 282 and redundant row circuitry 276 until the next pulse of the global signal FIREROW(N). The address capture circuit 48 can thus capture the second addresses RADD1, BADD1 earlier than would be the case if the row address latch 268 were not present.

Figure 5:
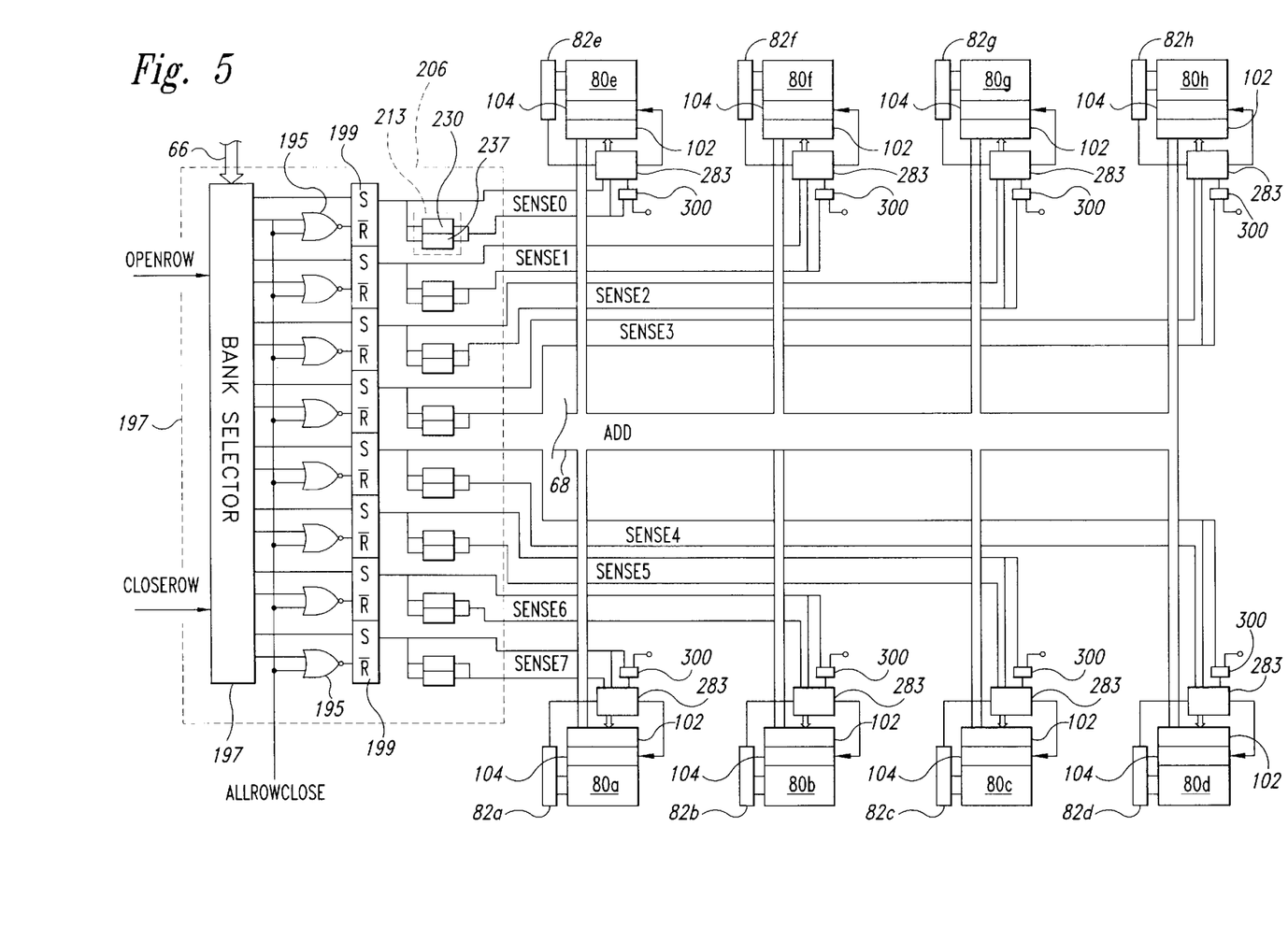
FIG. 5 is a schematic of a multibank array including a global control circuit and local timing circuits, usable in the memory device of packetized DRAM of FIG. 1.

The global signal generator 206 that generates the FIREROW(N) signals is shown in greater detail in FIG. 5. Each of the signals is produced in the global command generator 206 by a respective latch 199. Each of the FIREROW(N) signals is initiated responsive to a high going transition of an OPENROW signal and is terminated responsive to a high going transition of a signal from the command buffer/latch 202. A bank selector 197 controlled by the 3-bit bank address from the bus 66 directs the OPENROW signal to the set input of only one of the latches 199, thereby allowing the latches 199 to operate independently. The bank selector 197 also directs the CLOSEROW signal through a respective NOR gate 195 to the reset input of the same latch 199. The outputs of the latches 197 form the respective FIREROW(N) signals.

The command buffer/latch 202 can also supply an ALL-ROWCLOSE signal to the all of the NOR gates 195 to reset all of the latches 199 simultaneously. As will be described below, the resulting low-going transition of FIREROW(N) causes the local timing circuits 283 to deactivate their respective banks 80a–80h. Thus, the command latch/buffer 202 can close all of the banks 80a–80h with a single command.

In addition to providing the global row activation signals FIREROW(N), the global signal generator 206 also produces global sense signals. Each sense signal SENSE(N) is produced in a sense signal generator 213 responsive to the respective FIREROW(N) by a row modeling circuit 230. The row modeling circuit 230 produces the sense signal SENSE(N) with a model delay $\tau_1$ relative to FIREROW(N) that is sufficient to allow the selected row to be precharged, equilibrated, and activated. The row modeling circuit 230 is formed from a conductive line and input gates that approximate the response of the row line and the delays of the latch 218, delay circuits 219, 222 and the inverter 220. The row modeling circuit 230 thus approximates the response time for precharging, equilibrating, and activating a row of the bank 80a–80h in response to FIREROW(N). To more accurately model the row response, the conductive line is formed on the same substrate as the corresponding bank 80a–80h and is formed concurrently with the row lines in the bank 80a–80h. In addition to activating the row latch 268, the row activation signals FIREROW(N) also initiate timing signal generation by the local timing circuits 283, as will now be described.

Respective global signal lines 208, 210 carry the global control signals FIREROW(N), SENSE(N) from the global command generator 206 to each of the local timing circuits 283. As will be described below, most of the control signals for activating the banks 80a–80h are generated locally rather than at the global command generator 206, thereby allowing only two lines to carry control signals from the global command generator 206 to each of the various banks 80a–80h. Routing problems and space consumption of control signal lines are thereby reduced. Also, because the local timing control circuits 283 establish the timing of signals close to their respective banks 80a–80h, the local timing circuits 283 reduce deviations in relative timing of signals caused by signal propagation delays between the sequencer and decoder 60 and the respective banks 80a–80h.

Figure 6:
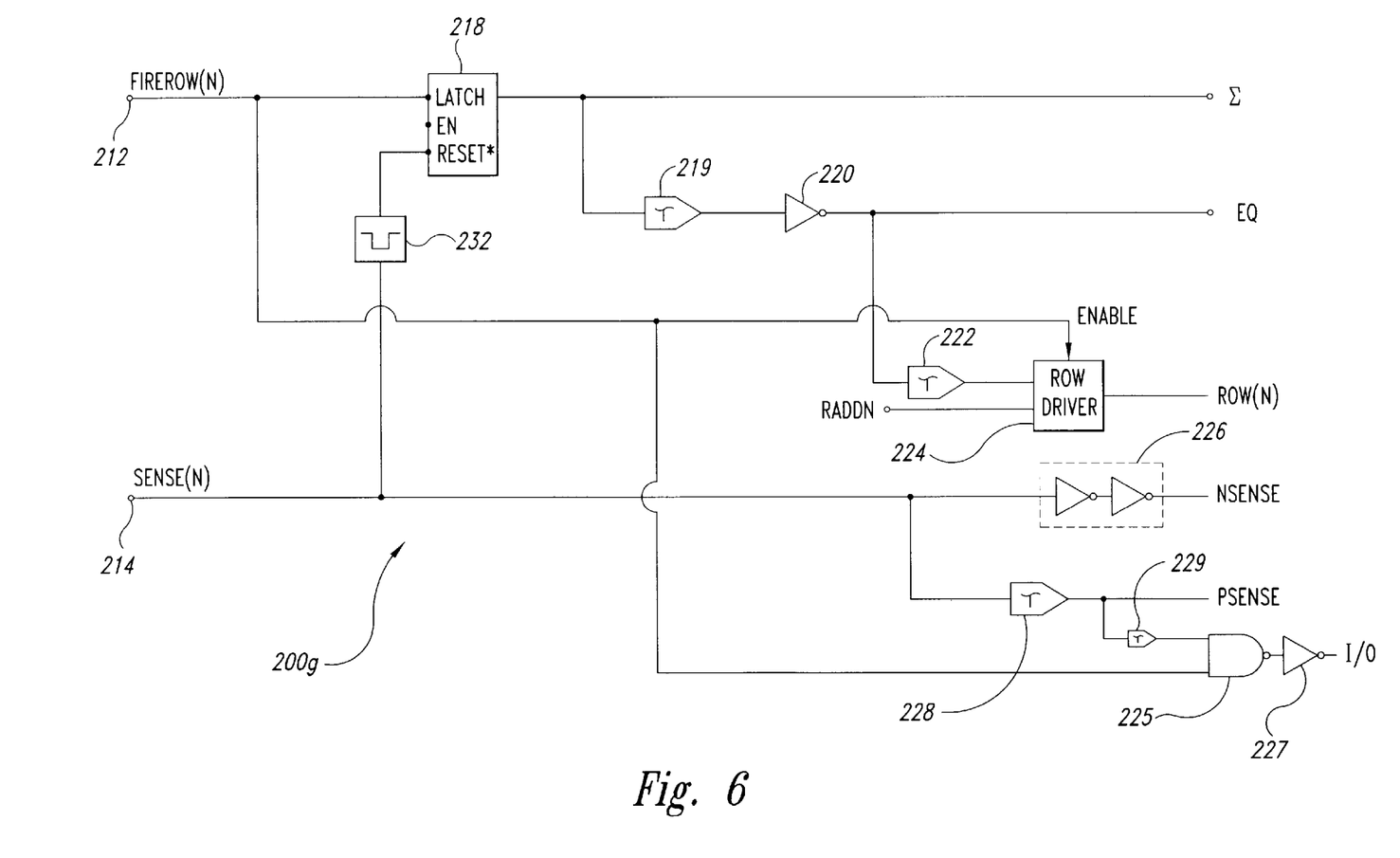
FIG. 6 is a schematic of one embodiment of a local timing circuit within the multibank array of FIG. 5.

FIG. 6 shows one of the local timing control circuits 283 in greater detail. The local timing circuit 283 receives the respective global control signals FIREROW(N), SENSE(N) from the global command generator 206 at respective input terminals 212, 214.

Figure 7:
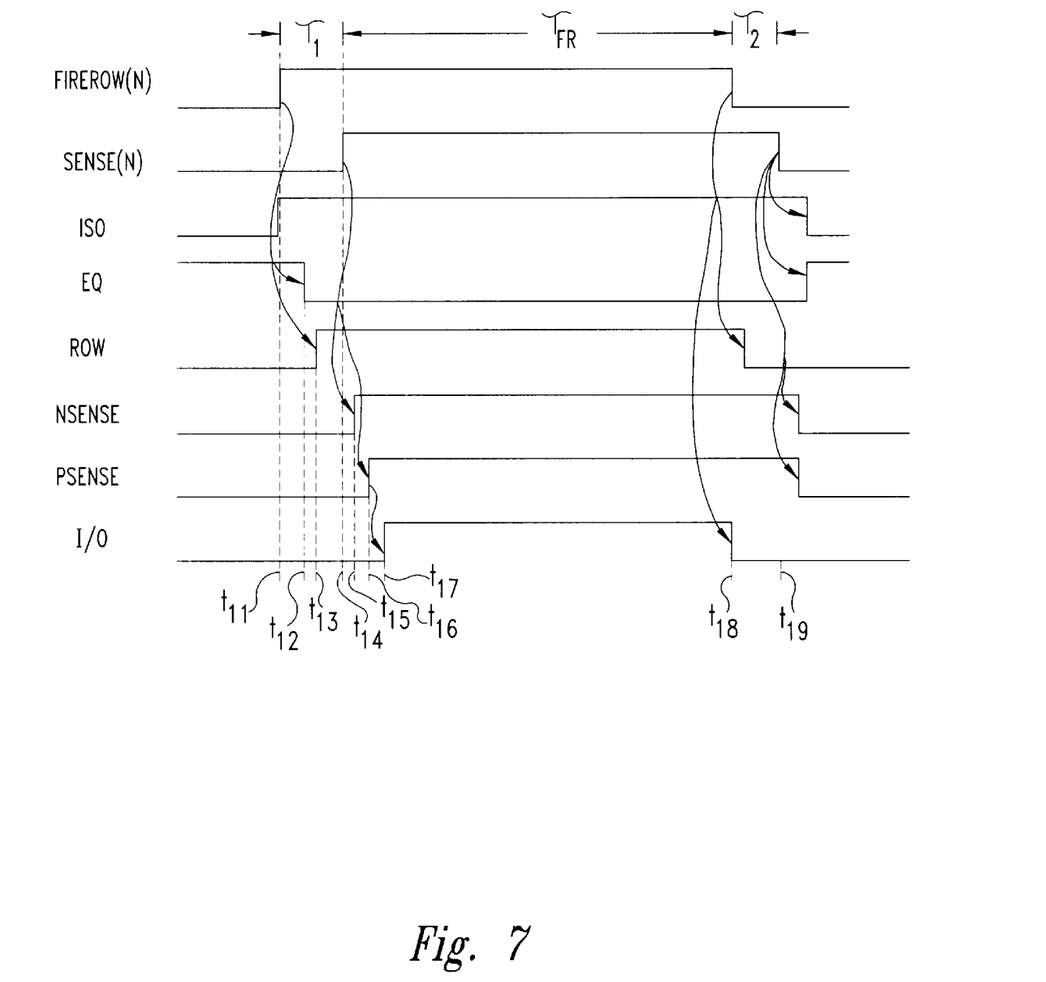
FIG. 7 is a signal timing diagram of selected signals in the multibank array of FIG. 5.

With reference also to the timing diagram of FIG. 7, when FIREROW(N) transitions high at $t_{11}$ it causes the output of a latch 218 to transition high. The latch output is applied directly to isolation gates in the I/O gating circuit 102 as an isolation signal ISO. Additionally, a delayed, inverted version of the latch output from a delay circuit 219 and an inverter 220 forms an equilibrate signal EQ that transitions low at time $tl_2$. FIREROW(N) also directly enables an I/O NAND gate 225; however, the output of the NAND gate 225 does not change until after the sense signal SENSE(N) transitions, as will be described below.

At time $t_{13}$, a version of the equilibrate signal EQ, delayed by a delay gate 222, enables a row driver 224 within the row latch/decoder/driver 82a–82h. If the row is selected, the row driver 224 provides a row driving signal ROWN that activates a row of the bank 80a.

The sense signal SENSE(N) transitions high responsive to the row modeling circuit 230 at time $t_{14}$ and indicates that sufficient time has passed to precharge, equilibrate, and activate the corresponding row. The sense signal SENSE(N) is buffered by an inverter pair 226 and directly activates N-sense portions of the sense amplifiers 104 at time $t_{15}$ to begin reading data from the bit lines. After a slight delay from a delay gate 228, the sense signal SENSE(N) then activates the P-sense portions of the sense amplifiers 104 at time $t_{16}$ to complete reading of data from the digit lines. The delayed sense signal SENSE(N) is then further delayed at a delay gate 229 to drive the output of the I/O NAND gate 225 low since the NAND gate 225 has been enabled by the FIREROW(N) signal. The low-going output of the I/O NAND gate 225 is then inverted by an inverter 227 to produce a high-going I/O signal I/O at time $t_{17}$.

After time $t_{16}$, FIREROW(N) remains high for a period $\tau_{FR}$ which is defined by the command sequencer and decoder 60 responsive to a command word from an earlier command packet. The period $\tau_{FR}$ is sufficient to allow the sense amplifiers 104 to read the digit lines and for the signals from the sense amplifiers to be latched in the output data paths. Typically, the period $\tau_{FR}$ is established upon initialization of the memory device 16.

At the end of the interval $\tau_{FR}$, FIREROW(N) transitions low, thereby disabling the row driver 224 and the I/O NAND gate 225. The remaining local control signals remain high, because the output of the latch 218 remains high. Returning to FIG. 3, the high-to-low transition of FIREROW(N) also activates a row discharge model 233 in the respective $\tau_1$ sense signal generator 213 that models the time $\tau_2$ necessary to properly discharge the activated row. After the discharge time $\tau_2$, the row discharge model 232 causes the sense signal SENSE(N) to transition low at time $t_{16}$. The low-going sense signal SENSE(N), via the inverter pair 226 (FIG. 6) and delay gate 228, deactivates the N-sense and P-sense portions of the sense amplifiers 104. Additionally, a high-to-low transition detector 232 detects the low going transition of the sense signal SENSE(N) and resets the latch 218 in response. The output of the latch 218 transitions low, thereby causing the isolation signal ISO and the equilibration signal EQ to transition low. The row signal is already low, because the previous transition of FIREROW(N) disabled the row driver 224, as described above.

Figure 8:
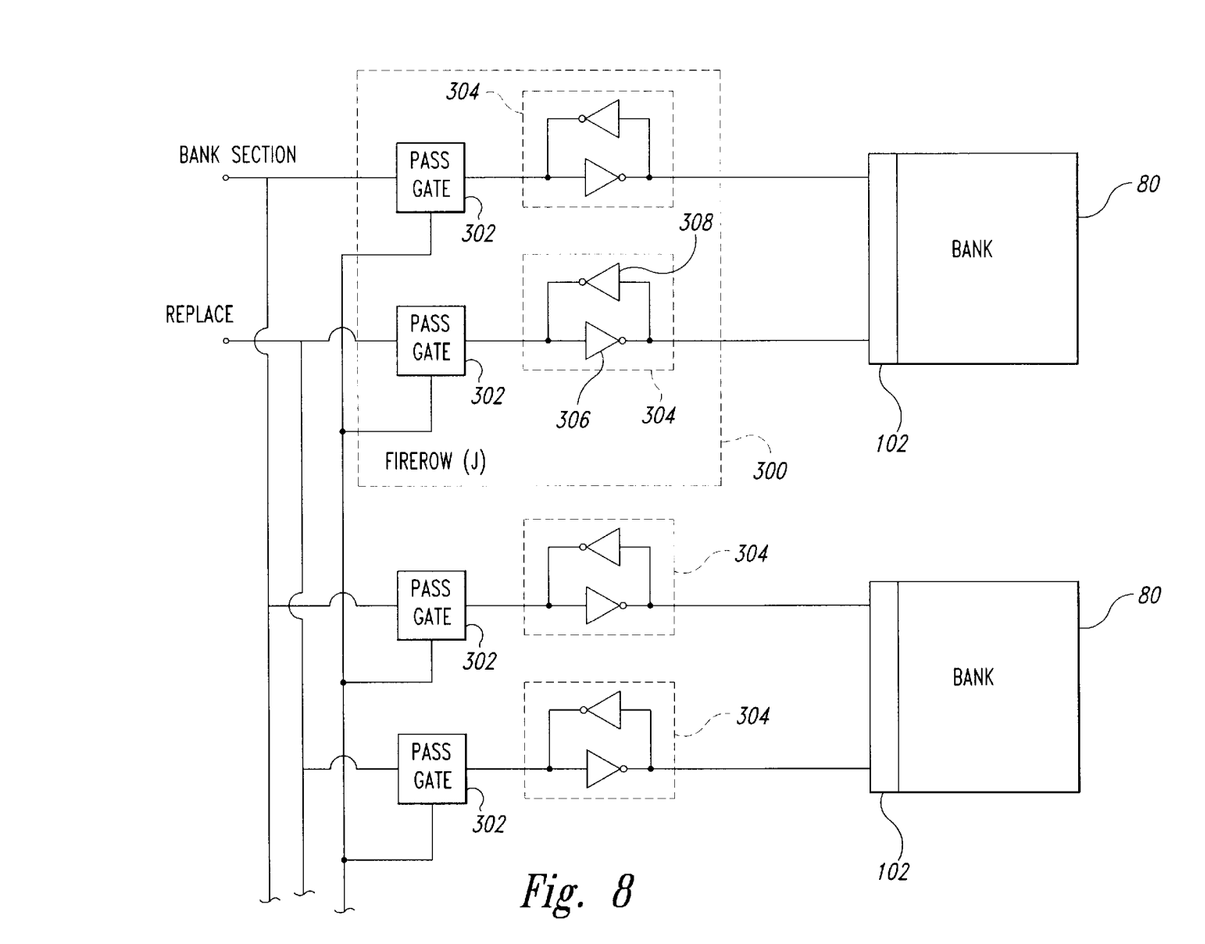
FIG. 8 is a schematic of a local signal latch coupled to a bank of the multibank array of FIG. 5.

In addition to driving the local timing circuits 283 directly, FIREROW(N) also acts as a latch signal at the respective local latch circuit 300, as will now be explained with reference to FIG. 8. Within the local latch circuit 300, FIREROW(N) is applied to control inputs of pass gates 302 that receive at their inputs a variety of signals, such as a bank section control signal, selected redundancy information, and phase control information. The output of the pass gate 302 drives a buffer 304 formed from an inverter 306 and a feedback inverter 308. The feedback inverter 308 is a weak inverter so that the respective input signal can control the state of the buffer 304. When FIREROW(N) transitions to an active state, FIREROW(N) closes all of the pass gates 302 of its respective bank 80a. Since only one of the global signals FIREROW(N) typically becomes active, pass gates 302 coupled to other banks 80b–80h remain open, thereby blocking their signals from reaching the respective bank 80b–80h. At the activated local latch circuit 300, the respective input signals activate the buffers 304 to provide control signals to the I/O gating circuit 102. FIREROW(N) thus latches selected global, local or address signals at the same time that FIREROW(N) initiates generation of the local control signals by the local timing circuits 283 (FIG. 6). Although only two pass gates 302 and buffers 304 are shown for each of the two banks 80a–80b in FIG. 8, one skilled in the art will recognize that more than two pass gates 302 and buffers 304 may be associated with each of the banks 80a–80h. Additionally, one skilled in the art will recognize that the local latches 302 can latch addressing information, such as redundancy or bank section control information, or can latch control signals. For example, in some applications, certain signals such as precharge and equilibrate signals may be generated globally and latched at the corresponding local latch circuit 300 responsive to FIREROW(N).

Figure 9:
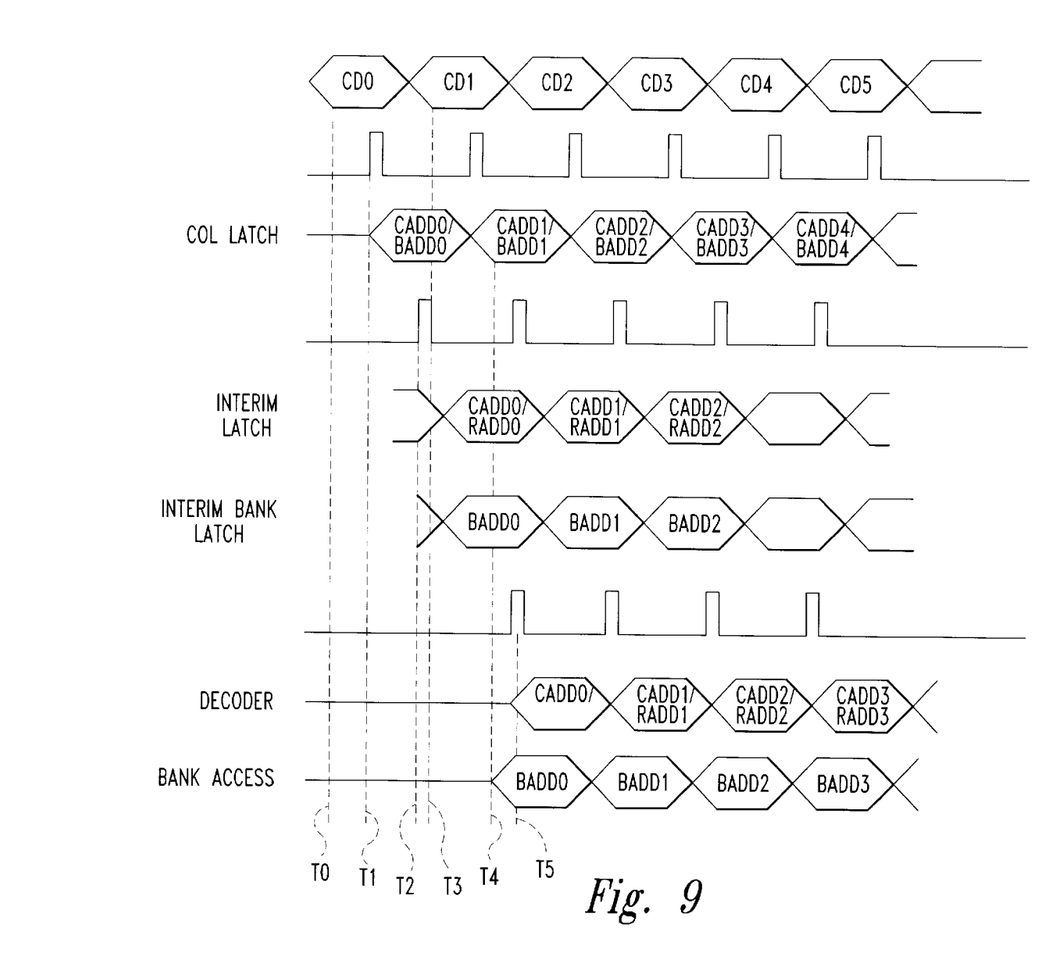
FIG. 9 is a signal timing diagram showing selected signals used in the column address path of FIG. 3.

In addition to activating the local control circuits 283, latching signals at the local latches and latching row addresses, FIREROW(N) also controls latching along the column address path 73 as will now be described with reference to FIGS. 3 and 9. As shown in FIG. 9, a first command packet CD0 arrives at the command latches 202 at time $t_{90}$. By time $t_{91}$, after the address capture circuit 48 has captured the column and bank addresses CADD0, BADD0, FIREROW(N) activates the column state machine 273. In response, the column state machine 273 outputs a column strobe signal COLSTR to activate a column/bank latch 272. The column/bank latch 272 latches the captured column and bank addresses CADD0, BADD0 and provides the column address CADD0 to redundant column circuitry 284. When the second command packet CD1 is received at time $t_{93}$, the column latch 272 has already latched the first column and bank addresses CADD0, BADD0. Therefore, the address capture circuitry 248 can immediately accept the second command CD1 and begin extracting the second column and bank addresses CADD1, BADD1. The second command CD1 will then be latched at time $t_{94}$, after the first column has been accessed.

The redundant column circuitry 284 determines whether the column address CADD0 corresponds to a defective column and outputs either the column address CADD0 or a redundant address REDCO to an interim column latch 287. At time $t_{93}$, a delay circuit 288 provides a column logic strobe LOGSTRC to the column latch 287 responsive to the column strobe COLSTR. In response to the column logic strobe LOGSTRC, the interim column latch 287 latches the address CADD0 or the redundant address RADD0 and the column address CADD0. Also responsive to the column logic strobe LOGSTRC, an interim bank latch 289 latches the bank address BADD0. Because the interim latches 287, 289 latch the addresses REDC0, BADD0 or CADD0, BADD0, the redundant circuit 284 is freed to accept the subsequent column address CADD1.

The interim column latch 287 and interim bank latch 289 provide the latched address REDC0 or CADD0, BADD0 to a column decoder 290. The column decoder 290 accepts the latched address CADD0, REDC0 and activates the corresponding column in the bank indicated by the bank address BADD0. The column decoder 290 then latches the active state of the column responsive to an activation signal from the sequencer and decoder 210. Because the column decoder 290 latches the active state of the activated column, the interim column latch 287 can thus accept and latch a subsequent address REDC0, CADD1 while the column is still active.

It should be noted that the operations of the column and row paths 73, 75 are not necessarily identical. As noted above, each command packet CDN is latched over two cycles of the internal clock CKINT (i.e., on four clock transitions or "ticks") and the corresponding data may be output to the data bus 130 (FIG. 2) several clock cycles later. Although data are written to or read from the banks 80a–h over two clock cycles, the amount of time necessary to precharge and equilibrate a row can be quite long relative to the actual time that data are actually being written to or read from a bank. To accommodate this long charging time, the row decoder 282 includes an internal latch 295 that latches an active state of a row corresponding to the row address RADD0 or redundant row address REDADD from the combining circuit 280. The row remains latched until the global signal FIREROW(N) transitions to an inactive state.

The activated row may remain activated for several cycles of the internal clock CKINT. Consequently, sequentially activated rows will be in different banks to prevent simultaneous activation of two rows in a single bank 80a–80h. For example, the bank address BADD0 accompanying a first row address RADD0 may correspond to a first of the banks 80a and a bank address BADD1 accompanying a second row address RADD1 would correspond to a different bank 80b–80h. The local timing circuits 283 activate a single row in a given bank.

Due to their physical structure and the fact that accessing a column typically involves simply sensing digit line voltages, columns are activated and de-activated much more quickly than rows. Consequently, two columns in a single bank may be accessed sequentially. Nevertheless, because the bank addresses BADDN are pipelined simultaneously with the column address CADDN, columns in different banks 80e–80h can be activated at sequential clock edges.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method of transferring data to or from one of a plurality of memory banks of an array in a memory device, the method comprising:

receiving a command at the memory device;
producing a global signal responsive to the command at a global signal generator;
receiving an address at the memory device;
transmitting the global signal from the global signal generator to a latching circuit;
latching the address at the latching circuit responsive to the global signal;
selecting a bank responsive to the address;
transmitting the global signal from the global signal generator to a local signal generator coupled to the selected bank, a respective local signal generator being provided for each of the banks;
producing a plurality of local control signals at the local signal generator responsive to the global signal; and
activating the selected bank responsive to the latched address and the local control signals.

2. The method of claim 1, further comprising latching redundancy information responsive to the global signal.

3. The method of claim 2, further comprising selectively gating address or redundancy information to the local control circuit responsive to the global signal.

4. The method of claim 3, further comprising latching the gated address or redundancy information at the local control circuit.

5. The method of claim 1 wherein the address includes bank address information, and wherein the act of producing a global control signal includes producing a bank-specific global control signal corresponding to the bank address information.

6. The method of claim 5, further comprising gating address, redundancy information or control signals to the local control circuit responsive to the bank-specific global signals.

7. A method of producing a set of signals for accessing banks of a memory array in a memory device, comprising the steps of:

receiving a command at the memory device;
receiving address information at the memory device, the address information being indicative of a selected bank;
identifying the selected bank responsive to the address information;
producing a first global signal responsive to the command and the identified selected bank at a global signal generator;
transmitting the first global signal from the global signal generator to a local circuit coupled to the identified selected bank, a respective local signal generator being provided for each of the banks;
generating a first plurality of control signals at the local circuit responsive to the first global signal, the first plurality of control signals including at least a control signal to equilibrate the identified selected bank and a control signal to activate sense amplifiers in the identified selected bank;
transmitting the first global signal from the global signal generator to a latch coupled to the identified selected bank;
latching an additional signal with the latch responsive to the first global signal; and
applying the first plurality of control signals and the latched additional signal to the identified selected bank.

8. The method of claim 7, further comprising:

producing a second global signal at the global signal generator, the second global signal being delayed relative to the first global signal by an expected response time of the bank;
transmitting the second global signal from the global signal generator to the local circuit;

generating a second plurality of control signals at the local circuit responsive to the second global signal; and applying the second plurality of control signals to the identified selected bank.

9. A method of accessing a selected bank of a memory array in a memory device, the array having a plurality of banks, comprising the steps of:

generating a first control signal;

generating a row activation signal corresponding to the selected bank at a first location in the memory device;

transmitting the row activation signal from the first location to a local circuit coupled to the selected bank, a respective local circuit being provided for each of the banks;

receiving the row activation signal at the local circuit;

producing a plurality of local control signals at the local circuit in response to the row activation signal, each of the local control signals having a respective transition following the row activation signal by a time defined by the local circuit and corresponding to a respective response time of the selected bank;

transmitting the row activation signal to a latch coupled to the selected bank;

latching the first control signal with the latch in response to the row activation signal; and accessing the selected bank in response to the local control signals and the latched first control signal.

10. The method of claim 9, further comprisings:

generating a second control signal; and latching a second signal in response to the row activation signal.

11. The method of claim 10 wherein the latching of a first signal in response to the row activation signal includes closing a first switching circuit in response to the row activation signal and wherein the latching of a second signal in response to the row activation signal includes closing a second switching circuit in response to the row activation signal.

12. The method of claim 9, further comprising latching a first set of addressing data in response to the row activation signal.

13. The method of claim 12 wherein the first set of addressing data includes bank control data.

14. The method of claim 12 wherein the first set of addressing data includes redundancy information.

15. The method of claim 12 wherein the first set of addressing data includes bank control data.

16. The method of claim 12, further comprising latching a second set of addressing data in response to the row activation signal.

17. The method of claim 12 wherein the first set of addressing data includes bank control data and the second set of addressing information includes redundancy information.

18. A method of accessing one or more selected locations in a memory device, comprising:

transmitting a first command to the memory device;

transmitting a first set of addressing data to the memory device, an addressing data including addressing information identifying a first selected bank;

generating a first signal responsive to the first command and the addressing information identifying the first selected bank;

latching a portion of the first set of addressing data responsive to the first signal;

generating a first set of selected control signals in a local signal generator responsive to the first signal, a respective local signal generator being provided for each of the banks; and accessing the first selected bank in response to the latched portion of the addressing data and the first set of selected control signals.

19. The method of claim 18 wherein generating a first signal responsive to the first command and the first set of addressing data comprises:

generating a global signal responsive to the first command; and directing the global signal along a selected path toward the selected bank to form the first signal.

20. The method of claim 18, further comprising:

transmitting a second command to the memory device;

transmitting a second set of addressing data to the memory device, the second set of addressing data including addressing information identifying a second selected bank;

generating a second signal responsive to the second command and the addressing information identifying a second selected bank;

latching a portion of the second set of addressing data responsive to the second signal while generating a first set of control signals responsive to the first signal;

generating a second set of control signals responsive to the second signal; and accessing the second bank in response to the latched portion of the second set of addressing data.

21. The method of claim 20 wherein the selected location accessed in response to the latched portion of the second set of addressing data is further responsive to the second set of control signals.

22. The method of claim 20 wherein the generating of a first signal responsive to the first command and the first set of addressing data comprises:

generating a first primary signal responsive to the first command; and directing the first primary signal along a selected path toward the first selected bank to form the first signal.

23. The method of claim 22 wherein the generating of a second signal responsive to the second command and the second set of addressing data comprises:

generating a second primary signal responsive to the second command; and directing the second primary signal along a selected path toward the second bank to form the second signal.

24. An address control circuit for a memory device having a plurality of banks, the memory device receiving a signal including a first command, a first address and a first bank address comprising:

a first address capture circuit adapted to capture the first address and the bank address, the first address capture circuit having a first expected address capture interval;

a global signal generator configured to produce a plurality of first global signals at respective global signal outputs responsive to the first command after the first expected address capture interval;

a first address latch having a first latch input coupled to the first address capture circuit, and a first address output, the first latch circuit being responsive to any of the first global signals at the first latch input to latch the first address from the first address capture circuit;

a plurality of respective local control circuits provided for the plurality of memory banks, each of the local control circuits having a timing control input coupled to a respective output of the global signal generator and being responsive to the respective first global signal to produce a plurality of local signals at respective local signal outputs, the plurality of local signals being coupled to the respective memory bank; and a first address decoder having a first address input coupled to the first address output, a decoder output adapted for coupling to a memory bank and a decoder control input coupled to a selected one of the local signal outputs.

25. The address control circuit of claim 24, wherein the global signal generator is configured to produce a second global signal, further comprising:

a command latching circuit coupled between the first local timing circuit and the global signal generator, the command latching circuit being responsive to the first global signal to latch the second global signal.

26. The address control circuit of claim 24, further comprising:

a gating circuit having a control input coupled to the global signal generator and, a signal input adapted to receive an input signal, and signal output coupled to the memory bank, the gating circuit being responsive to the first global signal to couple the signal input to the signal output.

27. The address control circuit of claim 26, further comprising a local latch coupled between the gating circuit and the memory bank.

28. The address control circuit of claim 24, further comprising:

a redundant detect circuit coupled between the first address latch and the first address decoder, the redundant circuit having a redundant input coupled to the first address output and a redundant output; and a second address latch coupled between the redundant detect circuit and the first address decoder, the second address latch including a second address input coupled to the redundant output and a second address output coupled to the first address decoder, the second address latch being responsive to a second latch signal to latch data from the redundant detect circuit.

29. The address path of claim 24 wherein the received signal includes a second address, further comprising:

a second address capture circuit adapted to capture the second address, the second address capture circuit having a second expected address capture interval;

a second address latch having a second latch input coupled to the second address capture circuit, a second latch input coupled to the global signal generator, and a second address output, the second latch circuit being responsive to the first global signal at the second latch input to latch the second address from the second address capture circuit; and a second address decoder having a second address input coupled to the second address output.

30. The address path of claim 24 wherein the memory device is a packetized memory device having a command data input adapted to receive the signal including the first address, further comprising a command latch coupled to the command data input.

31. A packetized memory device, comprising:

a memory array including a plurality of banks;

an address capture circuit adapted for coupling to a first external bus and operative to capture address information from the first external bus;

a command buffer having a command input adapted for coupling to a second external bus and a signal output, the command buffer being operative to capture a command from the second external bus and to produce a first global signal at the signal output in response thereto;

a switching circuit having a switching circuit signal input coupled to the signal output, a switching input coupled to the address capture circuit, and a plurality of switching outputs, the switching circuit being responsive to a first portion of the captured address information at the switching input to couple the switching circuit signal input to a selected one of the switching outputs;

an address latch coupled to the address capture circuit and configured to latch a second portion of the captured address information; and a plurality of local circuits, each coupled to a respective one of the banks, each of the local circuits including a signal input coupled to a respective one of the switching outputs, each of the local circuits further including a local latch having a latching input coupled to the respective switching output and a control signal input, each of the local latches being responsive to receipt of the first global signal at the respective latching input to latch a control signal at the control signal input and to apply a plurality of control signals to a respective bank.

32. The memory device of claim 31, further comprising:

data transfer circuitry coupled between each of the banks and the respective local control circuits, wherein each of the local circuits is responsive to receipt of the first global signal to provide a set of control signals to the respective bank.

33. The memory device of claim 32, further comprising address decoder coupled between the address latches and the data transfer circuitry.

34. The memory device of claim 33, further comprising redundant detect circuits coupled between the address latch and the address decoders.

35. The memory device of claim 31, wherein the first and second busses are the same bus.

36. A packetized memory device, comprising:

a memory array including a plurality of banks;

a command latch having an input terminal adapted to receive command packets including a bank address and command words;

command processing circuitry coupled to the command latch, the command processing circuitry being structured to produce command signals in response to the command words;

an address capture circuit configured to capture the bank address from the command packets;

a global signal generator having a first generator input coupled to the command processing circuitry, a second generator input coupled to the address capture circuit, and a plurality of global signal outputs corresponding in number to the number of banks, the global signal generator being operable to produce a respective bank-specific global signal at a respective global signal output in response to the command signals and the captured bank address;

a plurality of local latches corresponding to each of the banks, each local latch having a latching input coupled to the respective global signal output and a latch signal input adapted to receive signals directed to the corresponding bank, and a latch signal output; and a respective local circuit for each of the banks, each of the local circuits having a first input coupled to a respective global signal output of the global signal generator, a second input coupled to the latch signal output, and a local signal output coupled to the corresponding bank, each of the local circuits being responsive to the respective bank-specific global signal and the signals directed toward the corresponding bank to access the corresponding bank.

37. The memory device of claim 36 wherein the global signal generator comprises:

a signal source responsive to produce a general global signal; and a switching circuit responsive to the captured bank address to direct the general global signal to global signal output indicated by the captured bank address.

38. The memory device of claim 37 wherein the global signal generator includes:

a row model responsive to the general global signal to produce a sense signal delayed with respect to the bank-specific global signal, the row model having a model output coupled to the corresponding local circuit, wherein the local circuit is further responsive to both the sense signal and the bank-specific global signal to access the corresponding bank.

39. The memory device of claim 36, further comprising:

an address decoder coupled between the local circuit and the respective bank; and a row or column address latch coupled to the address capture circuit, the row or column address latch including a latching input and being responsive to the general global signal to latch row or column address, the row or column latch being configured to provide the latched row or column address to the address decoder.

40. The memory device of claim 36, further comprising:

a redundant row or column detect circuit coupled between the row or column address latch and the address decoder.

41. A computer system, comprising:

a processor;

an input device coupled to the processor;

an output device coupled to the processor;

a storage device coupled to the processor;

a bus coupled to the processor; and a memory device including:

a memory array including a plurality of banks;

a command latch having an input terminal adapted to receive command packets including a bank address and command words from the bus;

command processing circuitry coupled to the command latch, the command processing circuitry being structured to produce command signals in response to the command words;

an address capture circuit configured to capture the bank address from the bus;

a global signal generator having a first generator input coupled to the command processing circuitry, a second generator input coupled to the address capture circuit, and a plurality of global signal outputs corresponding in number to the number of banks, the global signal generator being responsive to produce a plurality of bank-specific global signals on respective outputs in response to the command signals and the captured bank address;

a plurality of local latches corresponding to each of the banks, each local latch having a latching input coupled to a respective output of the global signal generator and a latch signal input adapted to receive signals directed to the corresponding bank, and a latch signal output; and a plurality of local circuits corresponding in number to the number of banks, each of the local circuits having a first input coupled to a respective output of the global signal generator, a second input coupled to the latch signal output, and a local signal output coupled to the corresponding bank, each of the local circuits being responsive to the bank-specific global signal and the signals directed toward the corresponding bank to access the corresponding bank.

42. The computer system of claim 41, wherein the global signal generator comprises:

a signal source responsive to produce a general global signal; and a switching circuit responsive to the captured bank address to direct the general global signal to a respective global signal output corresponding to the bank indicated by the captured bank address.

43. The computer system of claim 41, wherein the global signal generator comprises:

a row model responsive to the general global signal to produce a sense signal delayed with respect to the bank-specific global signal, the row model having a model output coupled to the corresponding local circuit, wherein each of the local circuits is further responsive to both the sense signal and the bank-specific global signal to access the corresponding bank.

44. The computer system of claim 41, further comprising:

an address decoder coupled between the local circuit and the respective bank; and a row or column address latch coupled to the address capture circuit, the row or column address latch including a latching input and being responsive to the general global signal to latch row or column address, the row or column latch being configured to provide the latched row or column address to the address decoder.

45. The computer system of claim 44, further comprising:

a redundant row or column detect circuit coupled between the row or column address latch and the address decoder.

* * * * *